Aug. 23, 1966  E. H. SHIVELY  3,268,807
INSTRUMENTATION FOR DISPLAYING CHARACTERISTICS
OF ELECTROMAGNETIC WAVE DEVICES
Filed March 20, 1961  2 Sheets-Sheet 1
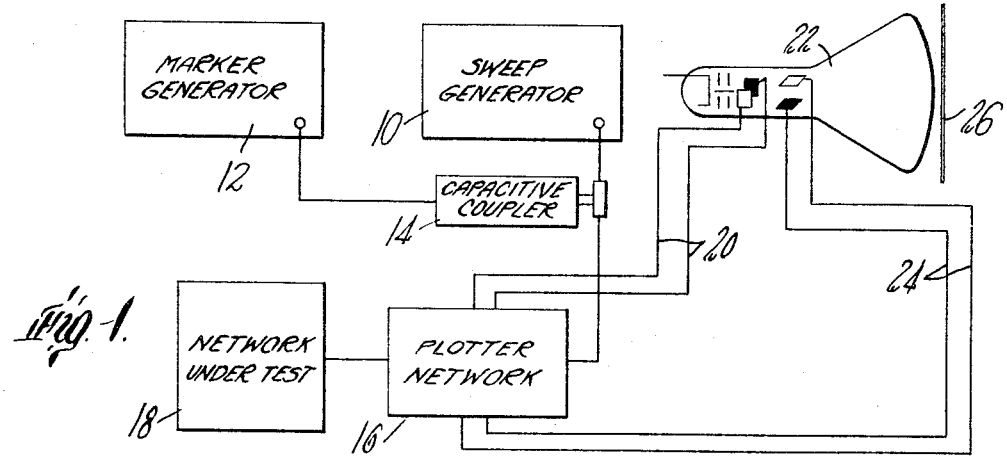
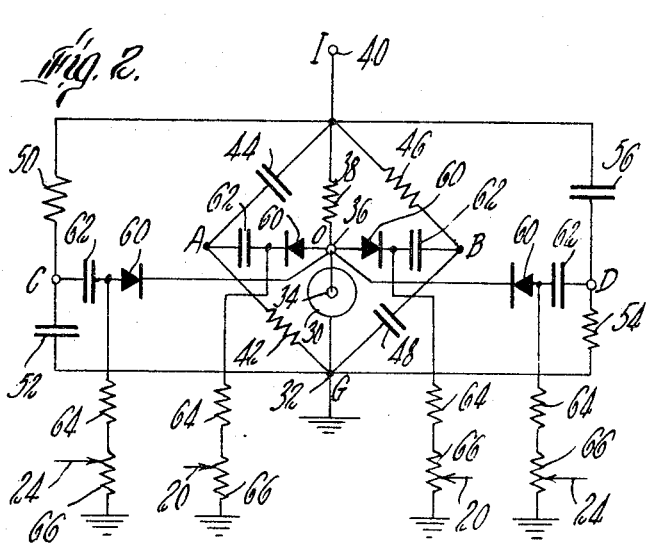
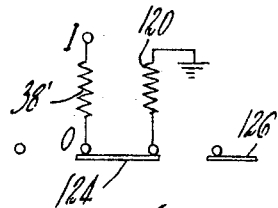
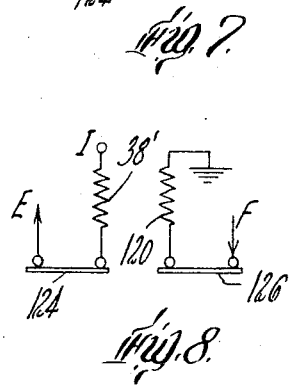
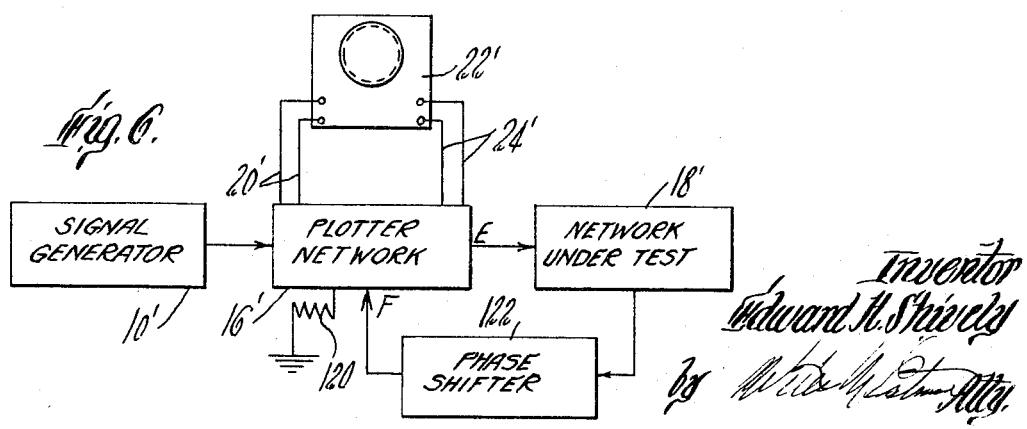

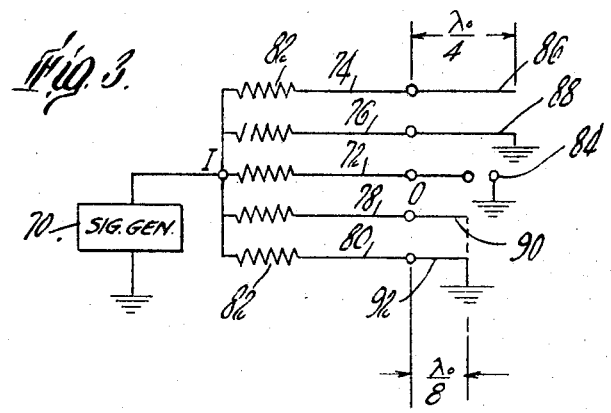
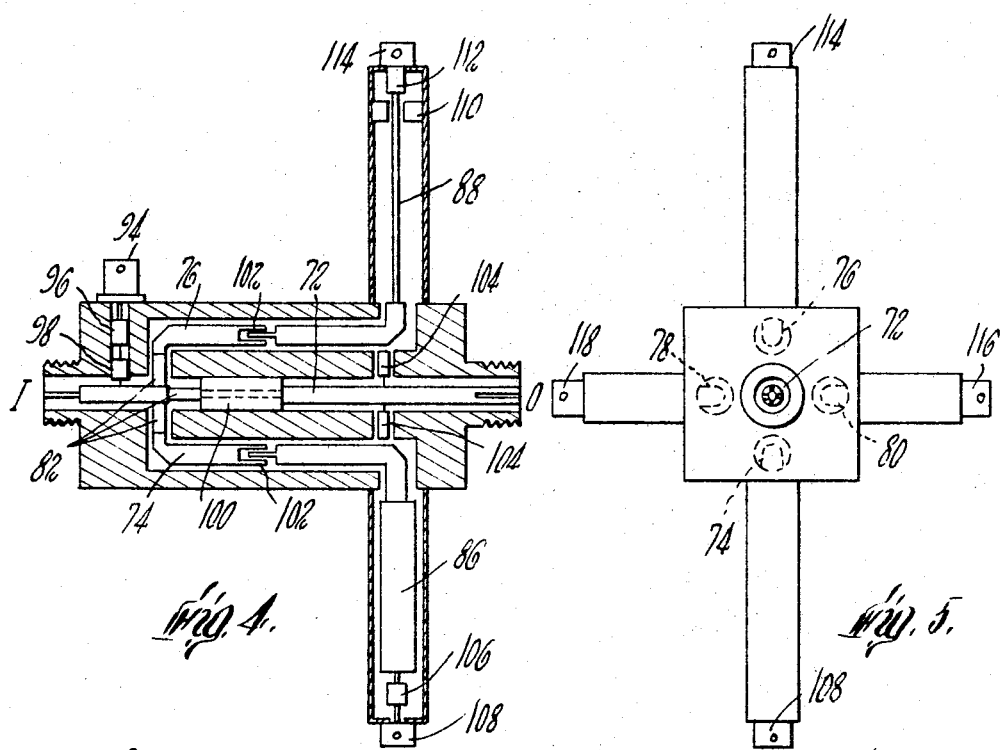

3,268,807
INSTRUMENTATION FOR DISPLAYING CHARACTERISTICS OF ELECTROMAGNETIC WAVE DEVICES
Edward H. Shively, Raymond, Maine, assignor to Dielectric Products Engineering Co., Inc., Raymond, Maine, a corporation of Maine
Filed Mar. 20, 1961, Ser. No. 96,902
26 Claims. (Cl. 324—58)

This invention relates to instrumentation for measuring characteristics of equipment operative at radio frequencies and more particularly to apparatus especially adapted for presenting impedance data in a continuous manner in the form of a Smith chart plot.

Certain characteristics of electromagnetic wave loads such as impedance characteristics and transmission coefficient characteristics often must be measured over a range of operating conditions. A conventional method of making impedance measurements at RF frequencies is on a point by point basis by use of the slotted line technique. In this method a probe is moved along the line and provides indications of the relative field strength at points in the slotted section so that the standing wave ratio and the impedance on the line may be calculated. While such a point by point impedance measurement is adequate for many purposes it is a tedious and time consuming operation when a large amount of impedance information is required. In addition this method is costly both in terms of the man hours required to obtain the information and of the delays in analysis that necessarily are a result of this point by point method of impedance measurement.

Accordingly, it is an object of this invention to provide improved apparatus for measuring characteristics of electromagnetic wave loads.

Another object of the invention is to provide improved impedance measuring apparatus capable of providing an immediate display of impedance information in convenient form.

Another object of the invention is to provide improved instrumentation operable over a substantial frequency band and which has an output signal of a form suitable for application to conventional cathode ray oscilloscope equipment for the display of relevant information on the characteristics of equipment operative at radio frequencies.

A further object of the invention is to provide an apparatus capable of presenting continuous data on an unknown impedance in a form suitable for display on a cathode ray oscilloscope.

Another object of the invention is to provide novel instrumentation for accurately measuring and indicating transmission coefficient characteristics of an electromagnetic wave load.

Another object of the invention is to provide novel and improved Smith chart display apparatus suitable for use with conventional cathode ray oscilloscope equipment.

Still another object of the invention is to provide a compact, rugged and accurate piece of equipment which may be utilized in conjunction with conventional equipment for quickly measuring the input impedance of antennas, transmission lines, and similar equipment which operate in the HF, VHF, UHF and microwave regions.

In accordance with the invention there is provided a system which senses the value of an electromagnetic wave on a transmission line or similar electromagnetic wave load and compares that value to two voltage planes which are maintained in quadrature over a wide band of frequencies. In the reflected wave sensing systems, the apparatus produces a direct voltage output which is proportional to the component of the reflection coefficient with respect to each reference voltage while in a modified form the apparatus may be utilized for display transmission coefficient data and is particularly useful in conjunction with systems having low insertion loss. In one embodiment of the invention there is provided a bridge arrangement which is fed by a constant voltage source of radio frequency energy. The electromagnetic wave load whose impedance is to be measured is connected in matched generator arrangement to the bridge configuration which comprises four resistance capacitance phase shifter networks. The components of these phase shifter networks are selected so that the voltages at the midpoint of the RC phase shifters are equal in magnitude and remain in time quadrature relative to one another over a substantial band of frequencies. Detectors connected between those midpoints and the electromagnetic wave load being measured produce D.C. voltages proportional to the square of the RF voltages which indicate the difference between the quadrature reference voltages and the magnitude and phase vector of the reflected voltage. The output from each detector is subtracted from the other output of the same plane and the results are applied to a suitable utilization device such as the horizontal and vertical beam deflection plates of a conventional balanced cathode ray oscilloscope so that an accurate plot of the reflection coefficient is displayed. The accuracy of this measurement is equivalent to that obtainable with slotted line techniques. An engraved Smith chart face plate is placed in front of the cathode ray tube so that, with the amplification adjusted in accordance with the signal applied to the bridge arrangement, the impedance of the electromagnetic wave load at the point being tested may be read directly. By making the face plate rotatable the RF impedance on the other points along the transmission line may also be read. The apparatus of the invention may be constructed of the lumped constant components or distributed constant components depending on the frequency range of interest and may be used in conjunction with coaxial lines, waveguides and other similar components for measuring such characteristics as reflection coefficients and transfer coefficients. It is a comparatively simple, compact and rugged instrument which provides an immediate accurate indication of RF characteristics of transmission lines and other components and is capable of utilizing conventional display equipment. Further, in a modified form, the instrument may be utilized to indicate transmission coefficient characteristics by comparing the characteristics of a known device with those of the network under test. This instrument is particularly useful in measuring networks which have small insertion loss.

Other objects and advantages of the invention will be seen as the following description of preferred embodiments thereof progresses in conjunction with the drawings, in which:

FIG. 1 is a block diagram of one form of the apparatus of the invention and associated components;

FIG. 2 is a schematic diagram of a form of the impedance plotting apparatus of the invention which utilizes lumped constant components;

FIG. 3 is a schematic diagram of a form of the impedance plotting apparatus which utilizes distributed constant components;

FIG. 4 is a diagrammatic elevational sectional view of one form of distributed constant impedance plotting apparatus;

FIG. 5 is an end view of the distributed constant impedance plotting apparatus shown in FIG. 4;

FIG. 6 is a block diagram of another form of the apparatus of the invention particularly useful in measuring transmission coefficient characteristics;

FIGS. 7 and 8 are schematic diagrams of a modified portion of the circuitry shown in FIG. 6 illustrating the operation of a sliding switch employed in transmission coefficient measurements; and FIGS. 9–11 are diagrams in Smith chart form of the form of display for impedance measurements and transmission coefficient measurements.

As shown in the block diagram of FIG. 1, the apparatus includes a sweep generator 10 and associated marker generator 12 of conventional design. A Jerrold Model 900A sweep generator has been utilized satisfactory and any marker generator with accurate frequency calibration will serve. A capacitive coupler 14 is provided to add the marker signal generated by the marker generator 12 to the sweep generator signal in conventional manner. This arrangement applies to the impedance plotter network 16 a constant radio frequency voltage at the desired frequency or over the desired frequency range. The ALC circuit utilized in the preferred embodiment includes a crystal detector connected to the generator's output which feeds back a signal into an automatic level control circuit so that the generator's output is adjusted to apply a constant RF voltage to the impedance plotter 16. The RF network 18 being measured is connected to the impedance plotter 16. Plotter output lines 20 are applied to the horizontal deflection inputs of the cathode ray oscilloscope 22 and the plotter output lines 24 are applied to the vertical beam deflection inputs of the oscilloscope. The oscilloscope is a Hewlett Packard Model 130B or a similar sensitive D.C. oscilloscope having difference channels. Positioned in front of the oscilloscope is a transparent face plate 26 engraved with a normal or expanded Smith chart impedance plot.

A lumped constant form of impedance plotter network is shown in the circuit diagram of FIG. 2. The RF network 18 being measured is shown as a coaxial line which has connected with its outer conductor 30 connected to the ground (G) terminal 32 of the network and its center conductor 34 connected to a center (O) point 36. A resistance 38 is connected between the center point 36 and the input (I) terminal 40 to which the constant voltage signal from the sweep generator 10 is applied. The resistance 38 has a value equal to the characteristic impedance of the coaxial line so that this arrangement, in conjunction with the constant input voltage, produces a "matched generator" so that reflections on the output line are absorbed. This is necessary since any re-reflection would add vectorially to the outgoing incident wave and produce amplitude and phase errors in that wave. With the reflections absorbed the outgoing incident wave is in phase with the voltage at point 40 and has half the amplitude.

Connected across this generator are four resistance capacitance phase shifters, all of which are connected between the point 40 and ground. These phase shifters include resistor 42 and capacitor 44; resistor 46 and capacitor 48; resistor 50 and capacitor 52; and resistor 54 and capacitor 56; and have midpoints A, B, C and D, respectively. The values of the components of the phase shifters are selected at the midpoint of the frequency range of signals which is to be examined by the plotter in accordance with the following equation:

$$R = \frac{1}{j\omega c} \tan \frac{\Theta}{2} \quad (1)$$

The equation is solved with $\Theta$ equal to 45° and to 135° to select resistive and capacitive components of suitable values to produce the vector relationship as shown in FIG. 9 where the voltages at the midpoints A, B, C and D of the resistance capacitive phase shifters fall on the circle at points 90° apart so that two voltages AB and CD are in quadrature to one another, and remain in quadrature over a substantial frequency range since the vector voltages produced at the phase shifter midpoints rotate substantially at the same rate and in the same direction as a function of frequency. It will be readily apparent to those skilled in the art that a variety of component values may be utilized in these phase shifters and that the values of those components are a function of the frequency range over which the plotting network is to be utilized. Lumped constant networks of this type have been utilized for making impedance plotting measurements over the ranges of 10–30 mc., 30–100 mc. and 100–300 mc.

A square law detector utilizing a crystal 60 and capacitor 62 is connected between the midpoint of each phase shifter and point O. It will be understood, of course, that other forms of detectors such as thermistors and bolometers, for example, may be utilized, and in general the illustrated embodiments are set forth in a descriptive and not in a limiting sense. This circuit detects the RF voltage at that point and provides a D.C. output voltage proportional to the square of the sensed RF voltage. Resistor 64 is connected to the crystal detector to provide RF isolation and an adjustable potentiometer 66 is utilized to control the amplitude of the D.C. voltages that are applied over lines 20, 24, to the balanced inputs of the oscilloscope 22.

The vector diagram in FIG. 10 shows the voltage vector relationship where there is a reflected voltage which has a magnitude $\rho$ and a phase angle $\phi$ with respect to the AB axis. It will be noted that the sensed point O has shifted from the center of the vector diagram the distance $\rho$. The phase of the reflected voltage may be referenced to the two sets of axes AB and CD which are in quadrature with one another. The RF voltage $$V_{AO} = 1 + \dot{\rho} = 1 + \rho \cos \phi + j\rho \sin \phi \quad (2)$$

and the voltage $$V_{BO} = 1 - \dot{\rho} = 1 - \rho \cos \phi - j\rho \sin \phi \quad (3)$$

Applying these voltages to a square law detector and then to a difference circuit (which is available in most deflection circuits of sensitive D.C. oscilloscopes), a horizontal beam deflection voltage proportional to the difference of the squares of these voltages results:

$$V_{AO}^2 - V_{BO}^2 = 4\rho \cos \phi \quad (4)$$

In like manner the RF voltage $$V_{CO} = 1 + j\dot{\rho} = 1 + \rho \sin \phi + j\rho \cos \phi \quad (5)$$

and the voltage $$V_{DO} = 1 - j\dot{\rho} = 1 - \rho \sin \phi - j\rho \cos \phi \quad (6)$$

These voltages, squared and applied to difference channels of the vertical deflection elements of the cathode ray oscilloscope, provide a signal proportional to $\rho \sin \phi$.

The oscilloscope beam position thus represents a polar (Smith chart) plot of the reflection coefficient and when an engraved transparent Smith chart face plate is placed in front of the cathode ray tube and the oscilloscope amplification adjusted to suit the input voltage supplied by the sweep generator 10 an accurate measurement of the RF impedance at the point measured at the coaxial line may be read directly. The plotting apparatus may be used with full or expanded scale Smith charts.

A similar arrangement of impedance plotting apparatus utilizing distributed constant components is shown in FIGS. 3–5. With reference to the diagram of FIG. 3, this bridge arrangement is also fed at input point I by a source 70 of constant voltage radio frequency energy which is controlled by suitable automatic level control circuitry. At this input point I, five identical transmission lines 72, 74, 76, 78 and 80 are connected. Each line has a resistor 82 equal to the characteristic impedance of the line inserted in series with it so that, when the voltage at point I is held constant, the reflections coming back toward point I on any of the lines are absorbed and the incident voltages on all the lines are equal and constant.

While the lines are indicated as coaxial the system may utilize other types of transmission lines such as strip line, waveguide, etc. Line 72 is the main line and the component 84 being measured is connected to that line at point O. The other four transmission branch lines are placed into close proximity with this main line at point O and detectors are connected between the main line at that point and four supplementary lines 86, 88, 90, 92. Two of these supplementary lines 86, 88 are terminated in reactances consisting of a short circuited and an open circuited section of tranmission line respectively which are odd multiples of one quarter wave length at the designed center frequency of the circuitry so that a first reference plane is established with two voltages that are 180° out of phase with each other. The other two lines 90, 92 are also terminated in open and shorted sections of transmission lines respectively but which are one eighth wave shorter than the reactance associated with lines 86, 88 at the designed center frequency so that a second reference plane is established that is in quadrature with respect to the first reference plane. The characteristic impedances of these open circuited and short circuited lines are adjusted to give best tracking of voltage reflections with frequency. The established reference planes rotate as the signal frequency changes and tend to remain in substantially quadrature relation. This results in a vectro time diagram of voltages that is exactly the same as that for the lumped constant bridge.

Diagrammatic views of a typical configuration of this distributed constant impedance plotter are shown in FIGS. 4 and 5, the output of signal generator 70 being applied through terminal 94 (Type BNC), series resistor 96 and the ALC crystal 98 to the input terminal (I). At that point the main line 72 and the four supplementary lines 74, 76, 78 and 80 are connected through fifty ohm jacketed resistors 82 to give the desired matched generator characteristic. In addition, a dielectric load 100 (Teflon or other suitable material) is utilized to make the phase length of the main line 72 equal to the supplementary lines. The inner conductors of the reference lines 74, 76, 78 and 80 are sectionalized by series capacitors 102 which have negligible reactance at the RF frequency but isolate the D.C. signal voltages so that those voltages may suitably be brought out to the oscilloscope or other display device in well known manners.

A crystal detector 104 is connected between point O (on line 72) and each of the corresponding points or supplementary lines 74, 76, 78 and 80. Beyond the point of connection to the detectors these lines are terminated in open circuited and short circuited lengths of transmission line. Thus an open circuited quarter wave length (at center frequency) line 86 is connected to line 74 at one end and at the other end is connected through a series resistance 106 to the terminal 108. This series resistance is a low impedance which functions to prevent the lines to the oscilloscope from resonating. In similar manner the short circuited quarter wave section 88 is connected through a bypass capacitor 110 and a series resistance 112 to terminal 114. The signals from terminals 108 and 114 are applied to the vertical deflection plates of the oscilloscope. In like manner the eighth wave length sections 90, 92 are connected through terminals 116, 118 (FIG. 5) to the horizontal deflection plates of the oscilloscope. The characteristic impedance ($Z_o$) of each eighth wave section is approximately fifty ohms while the characteristic of the open circuited quarter wave length section is approximately twenty-five ohms and of the short circuited section is approximately one hundred ohms. Plotter networks utilizing distributed constant components have been designed for use over the ranges 300–1000 mc. and 1000–3000 mc.

The modification of the invention for measuring transmission coefficients is illustrated in block form in FIG. 6. The basic bridge network is connected to a matched load and is utilized to establish a reference point for the incident voltage wave. The network to be tested is then connected to the bridge circuitry and the magnitude and phase of the resulting incident wave is compared with the established reference. The locus of the vector value which represents the transmission coefficient is displayed directly on the oscilloscope which may be provided with a suitably expanded Smith chart face plate. The system is extremely sensitive to small phase shifts since the shift can be viewed directly and is not masked by insertion loss as in the case of other circuits such as the conventional double hybrid comparison circuit used for these purposes. In addition the instrument enables measurements of insertion losses in the order of less than 0.01 db.

As indicated in FIG. 6, the circuitry includes a suitable signal generator 10' (with ALC), a transmission co-efficient bridge 16' which has a matched load resistor 120 connected between point O and ground and which applies quadrature plane referenced outputs over lines 20' and 24' to X axis and Y axis deflection circuits of the oscilloscope 22'. These components are substantially the same as the above described impedance measuring components. Also associated with the instrument is a phase shifter 122 and the network 18' whose transmission coefficient characteristics are to be measured. The bridge network is modified to include a switching arrangement indicated as a sliding switch, which has two elements 124 and 126 and which selectively connects the point O to the matching load resistor 120, or connects the resistor 38' to the output line E and the load resistor 120 to the input F from the phase shifter 122. The two positions of the sliding switch utilized in the modified bridge circuitry are indicated in FIGS. 7 and 8 respectively. A diagram of the transmission coefficient measurement is shown in FIG. 11 as it might be displayed on the face plate positioned in front of the cathode ray tube in the oscilloscope 22'.

In operation, the sliding switch is first placed in the position shown in FIG. 7 and the resulting spot, indicative of the magnitude and phase of the incident wave supplied by the generator 10', is centered on the oscilloscope screen to provide a reference point by adjusting the D.C. gain controlling potentiometers associated with the detector circuitries. The sliding switch components 124, 126 are then moved to the position shown in FIG. 8 to connect phase shifter 122 to the bridge circuit. This phase shifter is of the transmission line type and is adjusted until the spot is again centered, thus providing phase compensation for the cables that are to connect the network 18' to the bridge 16' for transmission coefficient measurements. The spot is centered at the intersection of axes 128 and 130 illustrated in FIG. 11 and adjustment of the phase shifter moves it along the arc 132. Then the network 130 whose transmission coefficient is to be determined is inserted into the circuit and the phase shifter is again adjusted as necessary to bring the spot onto the screen. The locus of points of the vector which represents the transmission coefficient is shown by the line 134 indicated in FIG. 11 and by adjusting the phase shifter or changing the input frequency the spot will trace the locus of the tip of this vector. Thus the spacing between arc 132 and arc 134 represents the magnitude of the insertion loss and the amount of phase compensation required to re-center the spot after insertion of network 18' provides an indication of the phase shift introduced by the network 18'. In other words, the displayed arc 132 is the locus of the incident wave vector $V_I$ whose origin is the right of FIG. 11 on the axis 128, and the displayed arc 134 is the locus of the vector value $V_I-KV_I$ where K is the insertion loss. This instrument enables transmission coefficient measurements to be made over the same range of frequencies as mentioned above in conjunction with the impedance plotter.

It will thus be seen that the invention provides a versatile apparatus for providing an immediate and accurate display of information on characteristics of electromagnetic wave loads. The apparatus is compact and rugged and enables an investigation of characteristics, such as impedance and transmission coefficients, to be carried out over a substantial frequency range so that variations of the characteristics of the network over that range may be easily detected and measured. While preferred embodiments of the invention have been shown and described variations therein will occur to those skilled in the art. For example, impedance measurements may be made with two phase shifter networks arranged in bridge form. Voltages between point O and the midpoints of two phase shifters which define a first reference plane and between point O and points I and G which define in a second reference plane in quadrature to the first plane may be detected to provide an impedance measurement display in a similar manner, but which is somewhat less independent of frequency variation. Output devices, other than oscilloscopes, as for example X–Y chart recorders may be desirably utilized in certain circumstances. Still other modifications will occur to those skilled in the art. Therefore, while preferred embodiments of the invention have been shown and described, it is not intended that the invention be limited to the disclosed embodiments or to details thereof and departures may be made therefrom within the spirit and scope of the invention as defined in the claims.

I claim:

1. Apparatus for measuring the reflection coefficient of an electromagnetic wave load comprising in combination means for terminating said load in a characteristic impedance, means for applying to said load and said characteristic impedance an RF signal of constant amplitude so that a zero reflection voltage reference point and a reflected signal from said load are provided, phase shift means to establish four reference points which define two voltage reference planes in quadrature of one another which intersect at said zero reflection reference point, and means to derive signal voltages referenced to said voltage reference planes which are indicative of the phase and magnitude of the reflection coefficient of said electromagnetic wave load.

2. The apparatus as claimed in claim 1 wherein said signal voltages deriving means includes four detectors, two of said detectors being connected between the zero reflection voltage reference point and the two reference points within one of voltage reference planes and the other two of said detectors being connected between the zero reflection voltage reference point and the two reference points in the other reference voltage plane, such that said detectors provide rectified voltages which are a function of the phase and magnitude of the reflection coefficient with respect to the associated voltage planes, means for differentially combining the rectified voltages associated with each plane to obtain voltages proportional to $\rho \cos \phi$ and $\rho \sin \phi$ where $\rho$ represents the amplitude of the reflection wave and $\phi$ its phase angle relative to the incident wave.

3. Apparatus for measuring the reflection coefficient of an electromagnetic wave load comprising in combination, means for terminating said load in a characteristic impedance, means for applying to said load and said characteristic impedance an RF signal of constant amplitude so that a zero reflection voltage reference point and a reflected signal from said load are provided, a plurality of resistance capacitance networks connected across the series combination of said electromagnetic wave load and its characteristic impedance, the resistance and capacitance components of said networks being proportioned so that two planes of reference voltages are established in quadrature to one another and which intersect at said zero reflection reference point, and means to derive signal voltages referenced to said voltage reference planes which are indicative of the phase and magnitude of the reflection coefficient of said electromagnetic load.

4. The apparatus as claimed in claim 3 and further including detector means connected between said zero reflection voltage reference point and each resistive capacitance network for rectifying the voltage therebetween, means for differentially combining the rectified voltages provided by the detectors from the RC networks which define the same plane, a cathode ray oscilloscope including means for deflecting the cathode ray in mutually perpendicular directions, and means for applying the differentially combined rectified voltages to said deflecting means so that said reflection coefficient is presented in Smith chart form.

5. Apparatus for providing signals proportional to the quadrature components of a characteristic of an electromagnetic wave load, the wave length of the center operating frequency of said apparatus being $\lambda_c$ comprising means for sensing a signal produced in response to the transmission of an electromagnetic wave between a wave generator and said electromagnetic wave load, phase shift means to establish four reference points which define two reference voltage planes in quadrature to one another, said voltage reference plane establishing means including means to provide a first voltage reference plane comprising a first open circuited transmission line $n\, \lambda_c/4$ in length and a first short circuited transmission lines $n\, \lambda_c/4$ in length where $n$ is an odd integer, and means to provide a second voltage reference plane comprising a second short circuited transmission line and a second open circuited transmission line, the length of each of said second transmission lines differing from the lengths of said first lines by the factor $\lambda_c/8$, means including a detector coupled between said sensing means and each said reference point to compare the sensed wave to said reference voltage planes, and means to generate an output signal proportional to the component of the sensed wave with respect to each said voltage reference plane.

6. The apparatus as claimed in claim 5 wherein said signal voltages deriving means includes four detectors, two of said detectors being connected between the zero reflection voltage reference point and points within one of voltage reference planes and the other two of said detectors being connected between the zero reflection voltage reference point and points in the other reference voltage plane, such that said detectors provide rectified voltages which are a function of the phase and magnitude of the reflection coefficient with respect to the associated voltage planes, means for differentially combining the rectified voltages associated with each plane to obtain voltages proportional to $\rho \cos \phi$ and $\rho \sin \phi$ where $\rho$ represents the amplitude of the reflection wave and $\phi$ its phase angle relative to the incident wave.

7. Apparatus for measuring characteristics of an electromagnetic wave load comprising phase shift means for establishing four reference points which define first and second voltage reference planes, said voltage reference planes being in quadrature to one another and intersecting at a common point, said common point corresponding to a characteristic of electromagnetic waves applied to said load, means for transmitting electromagnetic waves to said load, means for sensing electromagnetic waves relative to said four reference points and said load, means for dividing said sensed waves into first and second signal portions as functions of said first and second voltage reference planes respectively, and means for displaying the vector sum of said first and second signal portions.

8. Apparatus for measuring characteristics of an electromagnetic wave load comprising a plurality of resistance capacitance networks connected across said electromagnetic wave load, the resistance and capacitance components of said networks being proportioned so that two planes of reference voltages are established in quadrature to one another and which intersect at a common point, said common point corresponding to a characteristic of electromagnetic waves applied to said load, means for transmitting electromagnetic waves to said load, means for sensing electromagnetic waves relative to said load, means for dividing said sensed waves into first and second signal portions as functions of said first and second voltage reference planes respectively, and means for displaying the vector sum of said first and second signal portions.

9. The apparatus as claimed in claim 7 wherein the wavelength of the center operating frequency of said apparatus is $\lambda_c$ and said voltage reference plane providing means includes means to provide a first voltage reference plane comprising a first open circuited transmission line $n\lambda_c/4$ in length and a first short circuited transmission line $n\lambda_c/4$ in length where $n$ is an odd integer, and means to provide a second voltage reference plane comprising a second short circuited transmission line and a second open circuited transmission line, the length of each of said second transmission lines differing from the lengths of said first lines by the factor $\lambda_c/8$.

10. Apparatus for measuring the transmission characteristic of an electromagnetic wave load comprising an electromagnetic wave generator, phase shift means for establishing four reference points which define first and second voltage reference planes, said voltage reference planes being in quadrature to one another and intersecting at a common point related to the incident electromagnetic wave supplied by said electromagnetic wave generator, means for applying said incident electromagnetic wave to said load, means including a detector coupled between said load and each said reference point for sensing the incident electromagnetic wave transmitted through said load, means for dividing said sensed wave into first and second signal portions as functions of said first and second voltage reference planes respectively, and means for displaying the vector sum of said first and second signal portions to provide an indication of the transmission coefficient of said load.

11. Apparatus for measuring the transmission characteristics of an electromagnetic wave load comprising an electromagnetic wave generator, a plurality of resistance capacitance networks connected across said electromagnetic wave load, the resistance and capacitance components of said networks being proportioned so that two planes of reference voltages are established in quadrature to one another and which intersect at a common point, said common point providing an indication of the incident electromagnetic wave supplied by said incident electromagnetic wave generator, means for applying said incident electromagnetic wave to said load, means for sensing the incident electromagnetic wave transmitted to said load, means for dividing said sensed wave into first and second signal portions as functions of said first and second voltage reference planes respectively, and means for displaying the vector sum of said first and second signal portions to provide an indication of the transmission coefficient of said load.

12. The apparatus as claimed in claim 10 wherein the wavelength of the center operating frequency of said apparatus is $\lambda_c$ and said voltage reference plane providing means includes means to provide a first voltage reference plane comprising a first open circuited transmission line $n\lambda_c/4$ in length and a first short circuited transmission line $n\lambda_c/4$ in length where $n$ is an odd integer, and means to provide a second voltage reference plane comprising a second short circuited transmission line and a second open circuited transmission line, the length of each of said second transmission lines differing from the lengths of said first lines by the factor $\lambda_c/8$.

13. Apparatus for measuring the reflection coefficient of an RF network comprising in combination means for terminating said network in its characteristic impedance, means for impressing across said network and said characteristic impedance an RF frequency signal of constant amplitude so that a zero reflection reference point is established, means to provide two voltage reference planes in quadrature to one another which intersect at said zero reflection reference point comprising a plurality of resistance capacitance networks connected across the series combination of said RF network and its characteristic impedance, the resistance and capacitance components of said networks being proportioned so that fixed points therein establish two planes of reference voltages in quadrature to one another which intersect at said zero reflection reference point, means to derive signal voltages indicative of the phase and magnitude of the reflection coefficient of said RF network with respect to said voltage planes comprising a detector connected between the zero reflection reference point and each said fixed point to provide a rectified voltage which is a function of the phase and magnitude of the reflection coefficient with respect to the associated voltage plane, means for differentially combining the two rectified voltages associated with each plane to obtain voltages proportional to $\rho \cos \phi$ and $\rho \sin \phi$ where $\rho$ represents the amplitude of the reflection wave and $\phi$ its phase angle relative to the incident wave, a cathode ray oscilloscope including means for deflecting the cathode ray in mutually perpendicular directions, a transparent face plate with engraved Smith chart marking positioned in front of said oscilloscope, and means for applying the differentially combined rectified voltages to said deflecting means so that an indication of both the magnitude and phase of said reflection coefficient may be presented by said oscilloscope on said face plate in polar diagram form.

14. Apparatus for measuring the reflection coefficient of an RF network comprising in combination means for terminating said network in its characteristic impedance, means for impressing across said network and said characteristic impedance an RF frequency signal of constant amplitude so that a zero reflection reference point is established, means to provide two voltage reference planes in quadrature to one another which intersect at said zero reflection reference point comprising a main line and four supplementary lines of equal electrical length, one end of each of said lines being connected together at a common point and the other ends of said supplementary lines being disposed adjacent the other end of said main line, two of said supplementary lines being terminated in quarter wave length open and short circuits respectively and the other two of said supplementary lines being terminated in eighth wave length open and short circuits respectively to establish two planes of reference voltages in quadrature to one another which intersect at said zero reflection reference point, means to derive signal voltages indicative of the phase and magnitude of the reflection coefficient of said RF network with respect to said voltage planes comprising a detector connected between the said other end of said main line and the other ends of each of said supplementary lines to provide a rectified voltage which is a function of the phase and magnitude of the reflection coefficient with respect to the associated voltage plane, means for differentially combining the two rectified voltages associated with each plane to obtain voltages proportional to $\rho \cos \phi$ and $\rho \sin \phi$ where $\rho$ represents the amplitude of the reflection wave and $\phi$ its phase angle relative to the incident wave, a cathode ray oscilloscope including means for deflecting the cathode ray in mutually perpendicular directions, a transparent face plate with engraved Smith chart marking positioned in front of said oscilloscope, and means for applying the differentially combined rectified voltages to said deflecting means so that an indication of both the magnitude and phase of said reflection coefficient may be presented by said oscilloscope on said face plate in polar diagram form.

15. An electromagnetic wave plotting instrument for providing an indication of the transmission coefficient of an electromagnetic wave network comprising means for supplying an electromagnetic wave signal of constant amplitude, means to provide two voltage reference planes in quadrature to one another and which intersect at a common reference point, means to match-terminate said voltage plane providing means, means to derive from said supplied electromagnetic wave signals indicative of the magnitude of said supplied electromagnetic wave with respect to each said voltage reference plane, means to adjust said signals to provide an incident wave reference, means to insert said network between electromagnetic wave supplying means and said match-terminating means, and means responsive to said signal deriving means to provide signals indicative of the resulting phase and magnitude of the supplied electromagnetic wave relative to said incident wave reference.

16. The electromagnetic wave plotting instrument as claimed in claim 15 wherein said voltage reference plane providing means includes a plurality of resistance capacitance networks connected across said electromagnetic wave network, each said resistance capacitance network establishing a reference point in one of said reference planes.

17. The electromagnetic wave plotting instrument as claimed in claim 15 wherein said voltage reference plane providing means includes four supplementary lines of equal electrical length, two of said supplementary lines being terminated in quarter wavelength open and short circuits respectively, and the other two of said supplementary lines being terminated in eighth wavelength open and short circuits respectively.

18. The apparatus as claimed in claim 1 wherein said phase shift means includes four resistance capacitance networks, each said resistance capacitance network establishing a reference point in one of said reference planes, and further including a square law detector connected between each said reference point and said load.

19. The apparatus as claimed in claim 1 wherein said phase shift means includes four supplementary lines of equal electrical length, two of said supplementary lines being terminated in quarter wavelength open and short circuits respectively, and the other two of said supplementary lines being terminated in eighth wavelength open and short circuits respectively, and further including a square law detector connected between each said supplementary line and said load.

20. The apparatus as claimed in claim 7 wherein said phase shift means includes four resistance capacitance networks, each said resistance capacitance network establishing a reference point in one of said reference planes, and further including a square law detector connected between each said reference point and said load.

21. The apparatus as claimed in claim 7 wherein said phase shift means includes four supplementary lines of equal electrical length, two of said supplementary lines being terminated in quarter wavelength open and short circuits respectively, and the other two of said supplementary lines being terminated in eighth wavelength open and short circuits respectively, and further including a square law detector connected between each said supplementary line and said load.

22. The apparatus as claimed in claim 10 wherein said phase shift means includes four resistance capacitance networks, each said resistance capacitance network establishing a reference point in one of said reference planes.

23. The apparatus as claimed in claim 10 wherein said phase shift means includes four supplementary lines of equal electrical length, two of said supplementary lines being terminated in quarter wavelength open and short circuits respectively, and the other two of said supplementary lines being terminated in eighth wavelength open and short circuits respectively.

24. Apparatus for providing signals proportional to the quadrature components of a characteristic of an electromagnetic wave load comprising means for transmitting an electromagnetic wave between a wave generator and said electromagnetic wave load, phase shift means including four resistance capacitance networks to establish four reference points which define two reference voltage planes in quadrature to one another and intersecting at a common point, said common point corresponding to a characteristic of electromagnetic waves applied to said load, each said resistance capacitance network establishing a reference point in one of said voltage planes, means for sensing a signal produced as a result of the transmission of an electromagnetic wave between said generator and said load relative to said four reference points and said load, and means including a detector coupled between said sensing means and each said reference point for comparing the sensed signal to said reference voltage planes and dividing said sensed signal into first and second signal portions as functions of said first and second voltage reference planes respectively.

25. Apparatus for providing signals proportional to the quadrature components of a characteristic of an electromagnetic wave load comprising means for sensing a signal produced as a result of the transmission of an electromagnetic wave between a wave generator and said electromagnetic wave load, phase shift means to establish four reference points which define two reference voltage planes in quadrature to one another, said phase shift means including four supplementary lines of equal electrical length, two of said supplementary lines being terminated in quarter wave lengths open and short circuits respectively, and the other two of said supplementary lines being terminated in eighth wave lengths open and short circuits respectively, means including a detector coupled between said sensing means and each said reference point to compare the sensed wave to said voltage reference planes, and means to generate an output signal proportional to the component of the sensed wave with respect to each reference voltage plane.

26. Apparatus for providing signals proportional to the quadrature components of a characteristic of an electromagnetic wave load comprising means for providing a load signal produced as a result of the transmission of an electromagnetic wave between a wave generator and said electromagnetic wave load, phase shift means including four phase shift units, each said phase shift unit having an output terminal, means for applying an energizing signal from said wave generator to said phase shift means to establish four reference points at the respective output terminals of said phase shift units which define two reference voltage planes in quadrature to one another and intersecting at a common point, said common point corresponding to a characteristic of electromagnetic waves appplied to said load, each said phase shift unit establishing one of said reference points, means for sensing electromagnetic waves relative to said four reference points and said load, and means including detector means coupled between said load signal providing means and each said phase shift unit output terminal for relating said load signal to said reference voltage planes and dividing said sensed waves into first and second signal portions as functions of said first and second voltage reference planes respectively.

References Cited by the Examiner

UNITED STATES PATENTS

| | | | |
|---|---|---|---|
| 2,442,606 | 6/1948 | Korman | 324—58 X |
| 2,605,323 | 7/1952 | Samuel | 324—58 |
| 2,649,570 | 8/1953 | Radcliffe | 324—58 X |
| 2,735,064 | 2/1956 | Salzberg | 324—57 |
| 2,746,015 | 5/1956 | Alsberg | 324—58 |
| 2,797,387 | 6/1957 | Adams et al. | 324—58 |
| 2,876,416 | 3/1959 | Vinding | 324—58 |
| 2,986,700 | 5/1961 | Diehl | 324—83 |

WALTER L. CARLSON, *Primary Examiner.*

SAMUEL BERNSTEIN, *Examiner.*

A. E. RICHMOND, *Assistant Examiner.*